United States Patent [19]
Danielsson et al.

[11] Patent Number: 5,306,094
[45] Date of Patent: Apr. 26, 1994

[54] CONNECTOR FOR SECTIONS

[76] Inventors: Curt Danielsson, Bondegatan 4 C, S-645 32 Strängnäs; Olle Andersson, Vadstorp, 6-645 00 Strängnäs, both of Sweden

[21] Appl. No.: 778,114

[22] PCT Filed: Jun. 19, 1990

[86] PCT No.: PCT/SE90/00430
§ 371 Date: Dec. 19, 1991
§ 102(e) Date: Dec. 19, 1991

[87] PCT Pub. No.: WO90/15934
PCT Pub. Date: Dec. 27, 1990

[30] Foreign Application Priority Data
Jun. 21, 1989 [SE] Sweden ................. 8902287

[51] Int. Cl.$^5$ .................. F16B 7/00; F16B 12/00; F16S 3/00
[52] U.S. Cl. ..................... 403/11; 403/403; 403/382
[58] Field of Search .......... 403/403, 382, 11, 230, 403/231, 383, 402, 401, 205; 446/124, 125, 126

[56] References Cited
U.S. PATENT DOCUMENTS

| | | | |
|---|---|---|---|
| 3,211,481 | 10/1965 | Cadovius | 403/403 |
| 4,270,872 | 6/1981 | Kiyosawa . | |
| 4,273,462 | 6/1981 | Fukuchi | 403/231 |
| 4,589,792 | 5/1986 | Niziol | 403/403 X |
| 4,826,347 | 5/1989 | Baril | 403/383 |
| 4,973,187 | 11/1990 | Sauder | 403/403 X |

FOREIGN PATENT DOCUMENTS 655184  7/1963  Italy ................. 446/126

Primary Examiner—Randolph A. Reese
Assistant Examiner—Anthony Knight
Attorney, Agent, or Firm—Watson, Cole, Grindle & Watson

[57] ABSTRACT

A connector element which can join frame sections whose ends are sloped relative to their longitudinal axis provides at least two flat contact surfaces which are perpendicular to each other and includes guiding projections which extend away from the respective contact surfaces, each guiding projection having a base portion and a tip portion, the tip portion tapering at a maximum angle of 20° from an imaginary plane that extends perpendicularly to the associated contact surface.

4 Claims, 3 Drawing Sheets

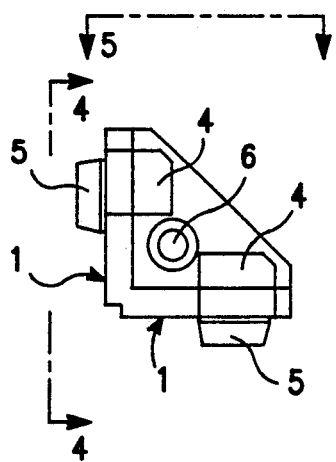
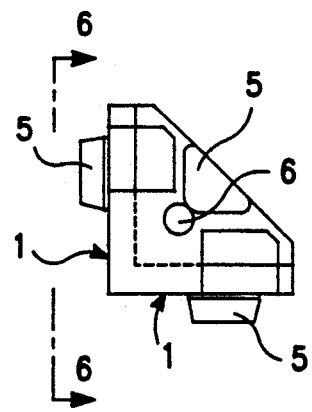
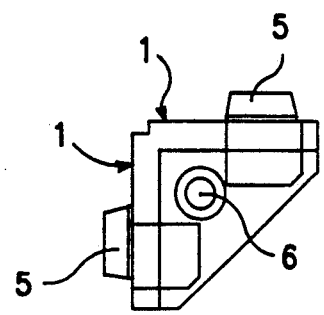
FIG. 3        FIG. 4        FIG. 5
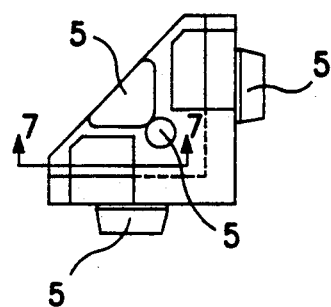
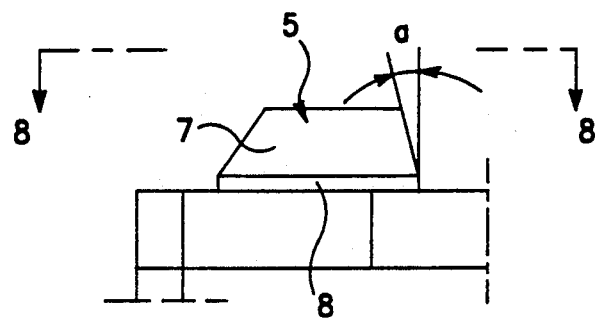
FIG. 6        FIG. 7
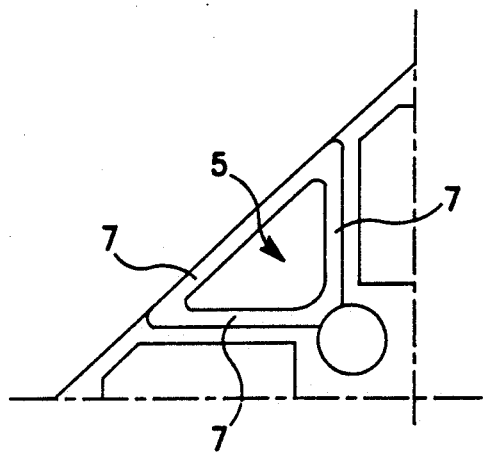
FIG. 8

CONNECTOR FOR SECTIONS

BACKGROUND OF THE INVENTION

Sections of extruded aluminum are used to a large extent in building up structures in public places and offices. Examples of such applications are electronic consoles for different purposes, e.g., radio and TV studios, and watching and controlling of processes and the like. The sections are connected at facing corners by the help of connecting means, to which the sections are attached by screws or similar means. Known connecting means have perpendicular contact surfaces to which the ends of the sections are joined. Up to now, known connecting means only permit jointing of sections into normal corners. In cases in which it is desired to have the sections meet at angles other than normal, alternative means for the jointing have had to be used.

A known connecting member has three normal contact surfaces for sections, and from these surfaces triangular guiding means protrude which are intended to extend into a cavity in the corresponding crosscut of the section to give a strong torsional connection between the connecting member and the section. The triangular guiding means is constituted by one half of a normal prism, which has been cut along a diagonal between two opposite corners. This corner member constitutes the prior art from which the present invention is an improvement.

DESCRIPTION OF THE INVENTION

The purpose of the present invention is to provide a connecting member which avoids the drawbacks of the known connecting members, but which permits a connection of sections to corners, at which the sections can meet under normal as well as sloping angles. The purpose has been achieved by a connecting member having at least two normal contact surfaces for sections and guiding means projecting from the same. The invention is characterized in that the guiding means show support surfaces sloping in a direction from the contact surface of the member. The guiding means permits a section which has been cut off with a contact surface sloping to the longitudinal direction of the section to be brought together with the connecting member in a way that its guiding means is brought into a corresponding guiding groove in the section without obstacles.

The guiding means can be constituted by one or more designs, the common feature of which consists in the sloping support surfaces proposed to fix the section in a desired position. It is also within the scope of the invention to utilize one or more supporting means to fix one and the same section. In this regard, a supporting means can be designed as two conical pins projecting from the contact surface of the connecting member or a longish conical means projecting from that surface.

The inclination of the support surfaces can be up to 20° to the normal to the contact surface without making the edges of the section project from the connecting member in an aesthetically unattractive manner. Preferably the supporting surface slopes 15° to the normal to the contact surface on the connecting member. It is also preferred to define an exact shape of the bottom of the guiding means by having the support surface slope firstly in a distance of about 1 mm from the contact surface. Differences in dimensions arising relative to the slopingly cut section will be taken up by plastic or elastic deformation of the section at the jointing.

DESCRIPTION TO DRAWINGS

The invention will now be described below as an example of application in connection with the enclosed drawings.

FIG. 3 shows the connecting member according to FIG. 2 seen from the side.

FIG. 4 shows the connecting member according to FIG. 3 seen in a view 4—4 according to FIG. 3.

FIG. 5 shows the connecting member according to FIG. 3 in a view 5—5 according to FIG. 3.

FIG. 6 shows the connecting member according to FIG. 4 in a view 6—6.

FIG. 7 shows a detail of a guiding means in a section along the line 7—7 according to FIG. 6.

FIG. 8 shows the guiding means in a view along the line 8—8 according to FIG. 7.

DETAILED DESCRIPTION OF THE PREFERRED EMBODIMENT

Figure 1:
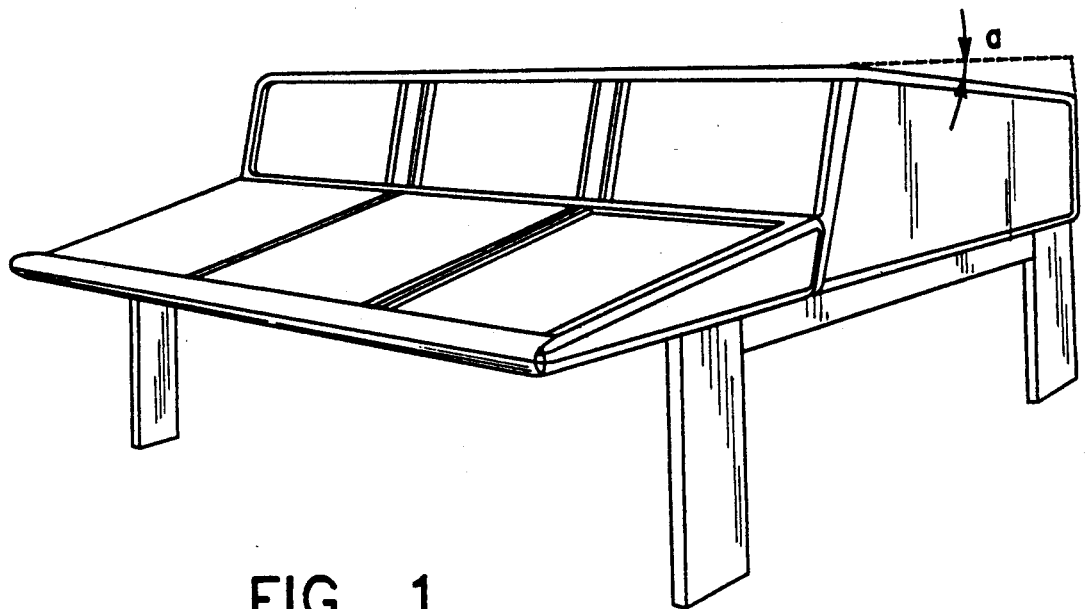
FIG. 1 shows a consol to be used in television.
Figure 2:
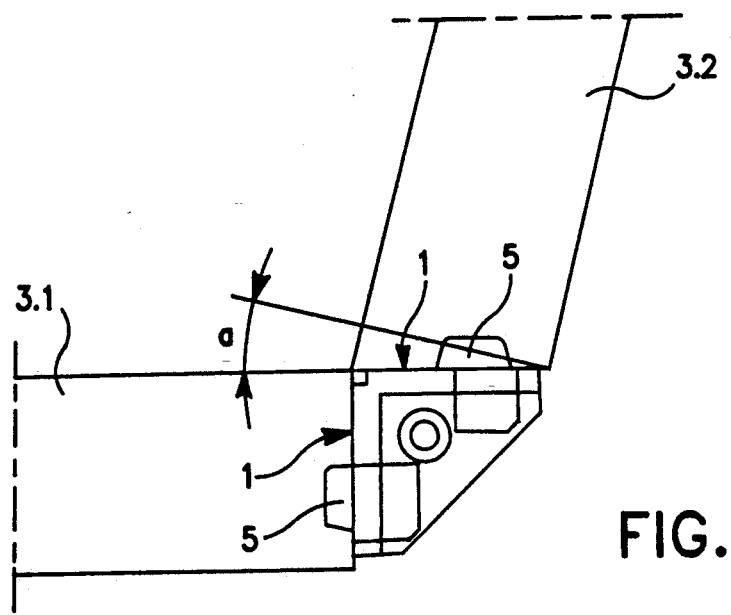
FIG. 2 shows a corner where two sections are jointed by help of a connecting member, one section sloping with respect to a contact surface of the connecting member.
Figure 9:
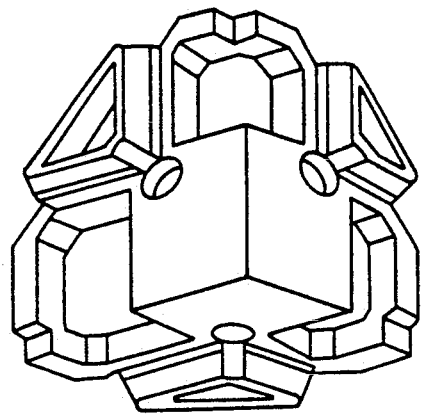
FIG. 9 is a perspective view of the inventive connecting member.

The connecting member according to FIG. 2 shows three perpendicular contact surfaces 1 to which a section is connected. A first section 3.1 is connected to the contact surface 1 at a right angle, while a second section 3.2 is connected to a corresponding contact surface at an angle "a". The second section 3.2 has been cut at an angle "a" to its longitudinal direction.

The connecting member according to FIG. 2 is shown separately in FIGS. 3-6. Each connecting member includes recesses 4 extending therein from each contact surface for accommodating sheets and the like which are carried by the sections. A guiding means 5 projects from each contact surface 1 each guiding means having a cross section parallel to the plane through a contact surface which is congruent with the cross section of a cavity in the section in a known manner (the cavity in the section is not shown on the figures). A connecting member also is provided with a countersunk hole 6 by which the connecting member can be screwed to each section.

The guiding means 5 projecting from each contact surface has according to FIG. 7 supporting surfaces 7 sloping at an angle "a" to the normal to the contact surface 1. The guiding means also includes a portion 8 nearest a contact surface 1 which is provided with supporting surfaces normal to the adjacent contact surface. The inclination angle "a" is preferably 15°.

We claim:

1. In a connector element for attaching together at least two frame sections used to mount sheets of a structure, said connector element providing at least two flat contact surfaces which are perpendicular to each other and to which respective ends of associated frame sections can be attached and including guiding means which project outwardly from each contact surface so as to extend into an identically shaped cavity in the respective end of the associated frame section and prevent torsional twisting, the improvement wherein at least one said guiding means defines an outer supporting surface which, as it extends away from the associated contact surface from which it projects, includes a base portion which extends about 1 mm away from said contact surface and has an external side surface that extends substantially perpendicularly to said associated contact surface, and a tip portion which has a side surface which tapers as it extends away from said base portion at a maximum angle of 20° from an imaginary plane that extends perpendicularly to said associated contact surface, thus enabling the connection thereto of frame sections whose ends are sloped relative to their longitudinal axis.

2. The connector element according to claim 1, wherein said angle is 15°.

3. The connector element according to claim 1, wherein said base portion is triangular in cross section and provides three side surfaces which extend perpendicularly to the associated contact surface.

4. The combination of at least two frame sections for mounting sheets of a structure and a connector element for attaching said frame sections together, said connector element providing a flat contact surface for the attachment of an end of each frame section, at least two of said contact surfaces being perpendicular to each other and including guiding means which project outwardly from each contact surface, at least one said guiding means defining an outer supporting surface having a base portion which extends about 1 mm away from said contact surface and has an external side surface that extends substantially perpendicularly to said associated contact surface, and a tip portion which tapers as it extends away from said base portion at a maximum angle of 20° from an imaginary plane that extends perpendicularly to said associated contact surface, and each of said frame sections defining a flat end for attachment to a contact surface of said connector element which includes a cavity identically shaped to said guiding means of said connector element, a flat end of at least one of said frame sections being sloped relative to a longitudinal axis of the associated frame section.

* * * * *